(12) United States Patent
Zhang

(10) Patent No.: US 10,908,790 B2
(45) Date of Patent: Feb. 2, 2021

(54) METHOD AND SYSTEM FOR DISPLAYING RECOMMENDATION INFORMATION

(71) Applicant: BANMA ZHIXING NETWORK (HONGKONG) CO., LIMITED, Kowloon (CN)

(72) Inventor: Xuan Zhang, Beijing (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 0 days.

(21) Appl. No.: 16/733,526

(22) Filed: Jan. 3, 2020

(65) Prior Publication Data

US 2020/0218410 A1 Jul. 9, 2020

Related U.S. Application Data

(63) Continuation-in-part of application No. PCT/CN2018/093230, filed on Jun. 28, 2018.

(30) Foreign Application Priority Data

Jul. 7, 2017 (CN) .......................... 2017 1 0552783

(51) Int. Cl.
*G06F 3/0484* (2013.01)
*G06F 9/451* (2018.01)
*G06F 3/0481* (2013.01)
*G06F 3/0488* (2013.01)

(52) U.S. Cl.
CPC .......... *G06F 3/0484* (2013.01); *G06F 3/0481* (2013.01); *G06F 3/0488* (2013.01); *G06F 9/451* (2018.02)

(58) Field of Classification Search
CPC ...... G06F 3/0484; G06F 9/451; G06F 3/0481; G06F 3/0488
See application file for complete search history.

(56) References Cited

U.S. PATENT DOCUMENTS

| 6,380,931 | B1 * | 4/2002 | Gillespie | G06F 3/0488 345/173 |
|---|---|---|---|---|
| 6,809,726 | B2 * | 10/2004 | Kavanagh | G06F 3/0418 178/18.01 |
| 7,423,635 | B2 | 9/2008 | Taylor | |
| 7,800,592 | B2 * | 9/2010 | Kerr | G06F 1/1626 345/173 |
| 8,411,061 | B2 * | 4/2013 | Bolsinga | G06F 16/9577 345/173 |
| 8,479,110 | B2 * | 7/2013 | Johnson | G06F 3/0481 715/702 |

(Continued)

FOREIGN PATENT DOCUMENTS

| CN | 103092466 | 5/2013 |
|---|---|---|
| CN | 104133618 | 11/2014 |

(Continued)

*Primary Examiner* — Jung-Mu T Chuang
(74) *Attorney, Agent, or Firm* — Van Pelt, Yi & James LLP

(57) ABSTRACT

Displaying recommendation information is disclosed including determining, based on touch hot zones of a user, a target display position for recommended information, the touch hot zones of the user being obtained based on historical touch behavior data of the user, and displaying the recommended information in the target display position.

21 Claims, 10 Drawing Sheets

(56) References Cited

U.S. PATENT DOCUMENTS

| | | | | |
|---|---|---|---|---|
| 8,656,314 B2* | 2/2014 | Locker | | G06F 3/04883 |
| | | | | 715/863 |
| 8,780,071 B2 | 7/2014 | Chen | | |
| 8,938,460 B2* | 1/2015 | Pollak | | G06F 16/24578 |
| | | | | 707/748 |
| 8,994,675 B2* | 3/2015 | Cho | | G06F 3/0237 |
| | | | | 345/168 |
| 9,047,011 B2* | 6/2015 | Lee | | G06F 3/04886 |
| 9,063,610 B2* | 6/2015 | Kim | | G06F 3/0418 |
| 9,164,610 B2* | 10/2015 | Ahn | | G06F 3/0304 |
| 9,165,257 B2* | 10/2015 | Badger | | G06F 3/04886 |
| 9,335,847 B2* | 5/2016 | An | | G06F 3/04883 |
| 9,335,924 B2* | 5/2016 | Jobs | | H04M 1/72522 |
| 9,377,849 B2* | 6/2016 | Ito | | G06F 3/01 |
| 9,389,714 B2* | 7/2016 | Vik | | G06F 3/041 |
| 9,405,454 B2* | 8/2016 | Lee | | G06F 3/0486 |
| 9,927,964 B2* | 3/2018 | Zalewski | | G06F 1/1626 |
| 10,152,162 B1* | 12/2018 | Bokma | | G06F 3/044 |
| 2006/0097991 A1* | 5/2006 | Hotelling | | G06F 3/0412 |
| | | | | 345/173 |
| 2006/0197750 A1* | 9/2006 | Kerr | | G06F 1/1626 |
| | | | | 345/173 |
| 2007/0033275 A1* | 2/2007 | Toivonen | | G06F 16/9562 |
| | | | | 709/224 |
| 2008/0180399 A1* | 7/2008 | Cheng | | G06F 3/041 |
| | | | | 345/173 |
| 2010/0013780 A1* | 1/2010 | Ikeda | | G06F 3/04883 |
| | | | | 345/173 |
| 2011/0029934 A1* | 2/2011 | Locker | | G06F 3/04883 |
| | | | | 715/863 |
| 2011/0202836 A1* | 8/2011 | Badger | | G06F 3/0237 |
| | | | | 715/702 |
| 2011/0248948 A1* | 10/2011 | Griffin | | G06F 3/041 |
| | | | | 345/174 |
| 2011/0289423 A1* | 11/2011 | Kim | | G06F 3/04886 |
| | | | | 715/741 |
| 2012/0147057 A1* | 6/2012 | Lee | | G06F 3/0482 |
| | | | | 345/681 |
| 2012/0221929 A1* | 8/2012 | Bolsinga | | G06F 3/04883 |
| | | | | 715/205 |
| 2012/0306754 A1* | 12/2012 | Jeong | | G06F 3/04886 |
| | | | | 345/168 |
| 2012/0317520 A1* | 12/2012 | Lee | | G06F 3/04817 |
| | | | | 715/863 |
| 2012/0326996 A1* | 12/2012 | Cho | | G06F 3/0237 |
| | | | | 345/173 |
| 2014/0009412 A1* | 1/2014 | Ahn | | G09G 3/3208 |
| | | | | 345/173 |
| 2014/0250132 A1* | 9/2014 | Pollak | | G06F 16/44 |
| | | | | 707/748 |
| 2014/0300560 A1* | 10/2014 | An | | G06F 3/0488 |
| | | | | 345/173 |
| 2014/0327629 A1* | 11/2014 | Jobs | | G06F 3/04883 |
| | | | | 345/173 |
| 2015/0153932 A1* | 6/2015 | Jiang | | H04M 1/72522 |
| | | | | 715/835 |
| 2015/0160794 A1* | 6/2015 | Huang | | G06F 3/0488 |
| | | | | 715/810 |
| 2015/0177957 A1* | 6/2015 | Bae | | G06F 3/04842 |
| | | | | 715/835 |
| 2015/0199117 A1* | 7/2015 | Zalewski | | G06F 3/03547 |
| | | | | 715/765 |
| 2015/0346895 A1* | 12/2015 | Bokma | | G06F 1/3262 |
| | | | | 345/173 |
| 2015/0346903 A1* | 12/2015 | O'Connor | | G09G 5/18 |
| | | | | 345/173 |
| 2017/0068441 A1 | 3/2017 | Kim | | |
| 2017/0329475 A1* | 11/2017 | Park | | G06F 3/0488 |
| 2017/0336916 A1* | 11/2017 | Lee | | G06F 3/04842 |
| 2018/0308147 A1* | 10/2018 | Chen | | G06Q 30/0629 |
| 2018/0321842 A1* | 11/2018 | Lee | | H04M 1/725 |

FOREIGN PATENT DOCUMENTS

| | | |
|---|---|---|
| CN | 105630397 | 6/2016 |
| CN | 105739811 | 7/2016 |

\* cited by examiner

100

400

4100

600

METHOD AND SYSTEM FOR DISPLAYING RECOMMENDATION INFORMATION

CROSS REFERENCE TO OTHER APPLICATIONS

This application is a continuation-in-part of and claims priority to International (PCT) Application No. PCT/CN2018/093230, entitled RECOMMENDATION METHOD AND APPARATUS, DEVICE, AND STORAGE MEDIUM filed on Jun. 28, 2018 which is incorporated herein by reference in its entirety for all purposes, which claims priority to China Patent Application No. 201710552783.8, entitled A RECOMMENDATION METHOD, MEANS, DEVICE, AND STORAGE MEDIUM filed on Jul. 7, 2017 which is incorporated by reference in its entirety for all purposes.

FIELD OF THE INVENTION

The present application relates to a method and a system for displaying recommendation information.

BACKGROUND OF THE INVENTION

As terminal technology develops, applications (apps) associated with terminals are gradually incorporated into the lives of their users. An ever-increasing number of apps include recommendation functions which recommend relevant information to users and thus users acquire information more efficiently. As an example, when a user arrives at a commercial district, an app recommends coupon information for a merchant located in the commercial district. In another example, the app recommends, to the user, information on products similar to products that the user has previously browsed. In yet another example, the app recommends news or Weibo information that satisfies preferences of the user.

In conventional recommendation schemes, the information to be recommended is typically shown at a fixed display position. For example, the fixed display position corresponds to the lower-right corner or the upper-right corner of the display.

However, in actual applications, some users find performing an operation on the recommended information being displayed in the lower-right or upper-right corner to be inconvenient. Because the recommended information is displayed in the lower-right or upper-right corner, recommended information-related operations can be inconvenient to perform, which in turn leads to lower click-through rates for the recommended information.

SUMMARY OF THE INVENTION

The technical issue to be addressed by the present application includes providing a process capable of increasing operational convenience and click-through rates of recommended information.

Correspondingly, the present application also includes a system and a computer program product, which ensures the implementation and application of the above process.

To address the above issue, the present application discloses, in relation to one aspect, a process comprising:

determining, based on touch hot zones of a user, target display positions for recommended information, wherein the touch hot zones of the user are obtained based on historical touch behavior data of the user; and displaying the recommended information in the target display position.

In some embodiments, the determining of the target display position for recommended information comprises:

regarding a display position corresponding to the touch hot zone of the user as the target display position for recommended information; and/or adjusting position weights for multiple display positions based on the touch hot zones of the user, and determining, based on the adjusted position weights of the multiple display positions, target display positions for the recommended information.

In some embodiments, the adjusting of the position weights for multiple display positions based on the touch hot zones of the user comprises:

increasing position weights for display positions corresponding to the touch hot zones of the user.

In some embodiments, the determining of the target display positions for recommended information comprises:

acquiring, from the multiple display positions, to-be-allocated display positions having adjusted position weights comply with a predetermined weight condition;

allocating the to-be-allocated display positions to the recommended information; and regarding the to-be-allocated display positions as the target display positions for the recommended information.

In some embodiments, the allocating of the to-be-allocated display positions to the recommended information comprises:

ranking the to-be-allocated display positions to the recommended information in high-to-low priority order, wherein the adjusted position weights associated with to-be-allocated display positions for high-priority recommended information are higher than the adjusted position weights associated with to-be-allocated display positions for low-priority recommended information.

In some embodiments, the touch hot zones of the user are determined by:

acquiring historical touch behavior data of the user;

adding the historical touch behavior data to a touch behavior data set of the user; and analyzing the touch behavior data set of the user to obtain the touch hot zones for the user.

In some embodiments, the historical touch behavior data comprises touch coordinate points, and the analyzing of the touch behavior data set of the user comprises:

counting a number of touch coordinate points falling within first area units;

acquiring target first area units from the first area units in order of decreasing number of touch coordinate points in the first area units; and obtaining the touch hot zones of the user based on the target first area units.

In some embodiments, the historical touch behavior data comprises touch coordinate points, and the analyzing of the touch behavior data set of the user comprises:

counting the number of touch coordinate points falling within second area units in which a touch coordinate point is at the center;

acquiring target second area units from the second area units in order of decreasing number of touch coordinate points in the second area units; and obtaining the touch hot zones of the user based on the target second area units.

In some embodiments, the analyzing of the touch behavior data set of the user comprises:

analyzing the touch behavior data set of the user when a data volume corresponding to the touch behavior data set of the user, application use time corresponding to the touch behavior data set of the user, or both complies with a predetermined trigger condition.

In some embodiments, the adding of the historical touch behavior data to the touch behavior data set of the user comprises:

adding the acquired historical touch behavior data to the touch behavior data set of the user;

adding acquired historical touch behavior data within a preset time period to the touch behavior data set of the user;

adding acquired historical touch behavior data having a data volume that has reached a preset data volume threshold to the touch behavior data set of the user; or any combination thereof.

In another aspect, the present application discloses a system for displaying recommendation information, comprising:

a target position determining module configured to determine a target display position for recommended information based on touch hot zones of a user, wherein the touch hot zones of the user are obtained based on historical touch behavior data of the user; and an information displaying module configured to display the recommended information in the target display position.

In some embodiments, the target position determining module comprises:

a first target position determining submodule configured to regard a display position corresponding to the touch hot zone of a user as the target display position for the recommended information;

a second target position determining submodule configured to adjust position weights for multiple display positions according to touch hot zones of the user, and determine target display positions for the recommended information based on the adjusted position weights of the multiple display positions; or both.

In some embodiments, the second target position determining submodule comprises:

a weight-adjusting unit configured to increase position weights for the multiple display positions corresponding to the touch hot zones of the user.

In some embodiments, the second target position determining submodule comprises:

a to-be-allocated display position acquiring unit configured to acquire, from the multiple display positions, to-be-allocated display positions having adjusted position weights that comply with a predetermined weight condition; and a position allocating unit configured to allocate the to-be-allocated display positions to the recommended information, and regard the to-be-allocated display positions as the target display positions for the recommended information.

In some embodiments, the position allocating unit comprises:

a sequence allocating subunit configured to allocate the to-be-allocated display positions to the recommended information in high-to-low priority order, wherein adjusted position weights for to-be-allocated display positions for high-priority recommended information are higher than adjusted position weights for to-be-allocated display positions for low-priority recommended information.

In some embodiments, the system further comprises:

a data set collecting module configured to acquire historical touch behavior data of the user, and add the historical touch behavior data to a touch behavior data set of the user;

a data set analysis module configured to analyze the touch behavior data set of the user to obtain a touch hot zone for the user.

In some embodiments, the historical touch behavior data comprises touch coordinate points, and the data set analysis module comprises:

a first counting submodule configured to count a number of touch coordinate points falling within first area units;

a first area unit selecting submodule configured to acquire target first area units from the first area units in order of decreasing number of touch coordinate points in the first area units; and a first touch hot zone determining submodule configured to obtain touch hot zones of the user based on the target first area units.

In some embodiments, the historical touch behavior data comprises touch coordinate points, and the data set analysis module comprises:

a second counting submodule configured to count the number of touch coordinate points falling within second area units in which a touch coordinate point is at the center;

a second area unit selecting submodule configured to acquire target second area units from multiple second area units in order of decreasing number of touch coordinate points in the second area units; and a second touch hot zone determining submodule configured to obtain touch hot zones of the user based on the target second area units.

In another aspect, the present application discloses a computer program product being embodied in a tangible non-transitory computer readable storage medium and comprising computer instructions for performing one or more of the processes described above.

Embodiments of the present application address issues in the following respects:

In some embodiments, a target display position for recommended information is determined based on a touch hot zone of a current user, and the recommended information is displayed in the target display position. Because the touch hot zone of the current user can be obtained through an analysis of the historical touch behavior data of the current user, the touch hot zone of the current user can be used to indicate the touch area characterized by habitual operation of the current user, high-frequency operation of the current user, or both and can reflect operating patterns of the user with regard to the touch zone. Therefore, determining a target display position for recommended information based on the touch hot zone of the current user can result in a target display position being a favorable position that corresponds to the touch hot zone of the current user. Therefore, the present application can, to a certain extent, avoid situations where the user overlooks the recommended information as a result of the target display position being unfavorable. Furthermore, the present application can make selecting the recommended information more convenient for the user and can increase recommended information click-through rates.

BRIEF DESCRIPTION OF THE DRAWINGS

Various embodiments of the invention are disclosed in the following detailed description and the accompanying drawings.

DETAILED DESCRIPTION

Figure 1:
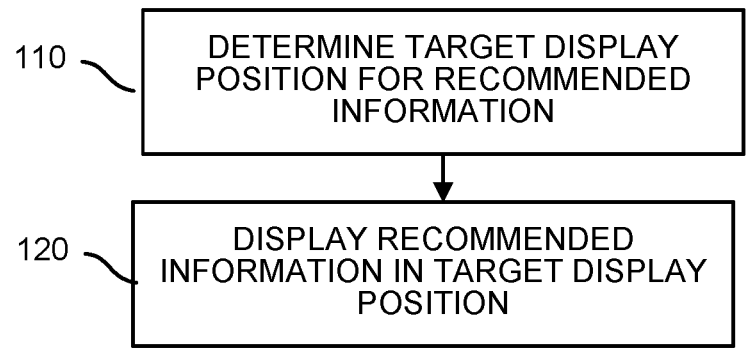
FIG. 1 is a flowchart of an embodiment of a process for displaying recommendation information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Conventionally, recommended information is displayed in a fixed display position such as in the lower-right corner or the upper-right corner. However, some users can find performing an operation on the recommended information displayed in the lower-right or upper-right corner inconvenient. The performing of the operation on the recommended information displayed in the lower-right or upper-right corner can result in relatively inconvenient recommended information-related operations, which in turn leads to lower click-through rates for the recommended information.

The present application discloses that a touch zone which a user finds easy to operate is often related to operating habits of the user. In some embodiments, these operating habits include terminal holding habits. For example, an easy-to-operate touch zone of a terminal habitually held in the right hand of the user is typically on the right side of the screen. In another example, the easy-to-operate touch zone of a terminal habitually held in the left hand of the user is typically on the left side of the screen. In yet another example, the easy-to-operate touch zone of a terminal habitually held in both hands of the user is typically in the middle of the screen. Therefore, collecting, accumulating, and analyzing the historical touch behavior data of a user typically reveals a pattern of an easy-to-operate touch zone for the user. The historical touch behavior data corresponds to previously recorded touch behavior data within a specific range of time. Thus, the present application obtains the touch hot zone of the user based on the historical touch behavior data of the user. Subsequently, the present application determines a target display position for recommended information based on the user's touch hot zone and display the recommended information in the target display position. The touch hot zone of the user can be used to indicate a touch area characterized by habitual operation of the user, high-frequency operation of the user, or both and can reflect the operating patterns of the user with regard to the touch zone. Therefore, touch hot zone-based recommendations can increase operating convenience and click-through rates for recommended information.

As an example, in the event that a terminal is habitually held in a user's right hand, the user's historical touch behavior data can be analyzed to obtain the following touch hot zone for the user: lower-right corner area. In the event that the terminal is habitually held in the user's left hand, then the historical touch behavior data of the user can be analyzed to obtain the following touch hot zone for the user: lower-left corner area. In the event that there is a user who habitually holds a terminal in both hands, then the historical touch behavior data of the user can be analyzed to obtain the following touch hot zone for the user: middle area. Furthermore, the target display position for the recommended information can be determined based on the touch hot zone of the user, and the recommended information can be displayed in the target display position. Thus, operating convenience and click-through rates for the recommended information can be increased.

The present technique can be applied to any terminal with internal or external touch sensors. For example, the terminals include: smart phones, personal digital assistants, tablets, e-readers, players, wearable devices, etc. The areas provided by the touch sensors for touch operations by users are referred to as touch areas. In some embodiments, the touch sensors include resistive touch sensors, capacitive touch sensors, or both. These touch sensors can include contact touch sensors, proximity touch sensors, or both. As an example, a touch sensor is to be activated when the user touches the touch sensor. As an example, a proximity touch sensor is to be activated when the user approaches the proximity touch sensor. In addition, the touch sensors can be single sensors, or can be, for example, a plurality of sensors arranged in an array. There are no restrictions on the particular terminals or touch sensors.

In addition, the terminals can also include display screens. The areas of the display screens can be the same as or different from the areas of the touch sensors. In some embodiments, the display screens are layered with the touch sensors to form a touch-sensitive device (e.g., a touchscreen or touch panel with touch sensing functions). Thus, the touch-sensing device can provide a user with areas for touch operations, i.e., touch areas.

The present technique can be applied to news platforms, location service platforms, shopping platforms, social networking platforms, and other application environments requiring information recommendation to increase operational convenience and click-through rates for recommended information. In addition, the recommended information can be any information. In some embodiments, the recommended information includes information such as advertisements, sales promotions, other promotions, cash transfers, etc. There are no restrictions on the application environments or the recommended information.

Figure 6:
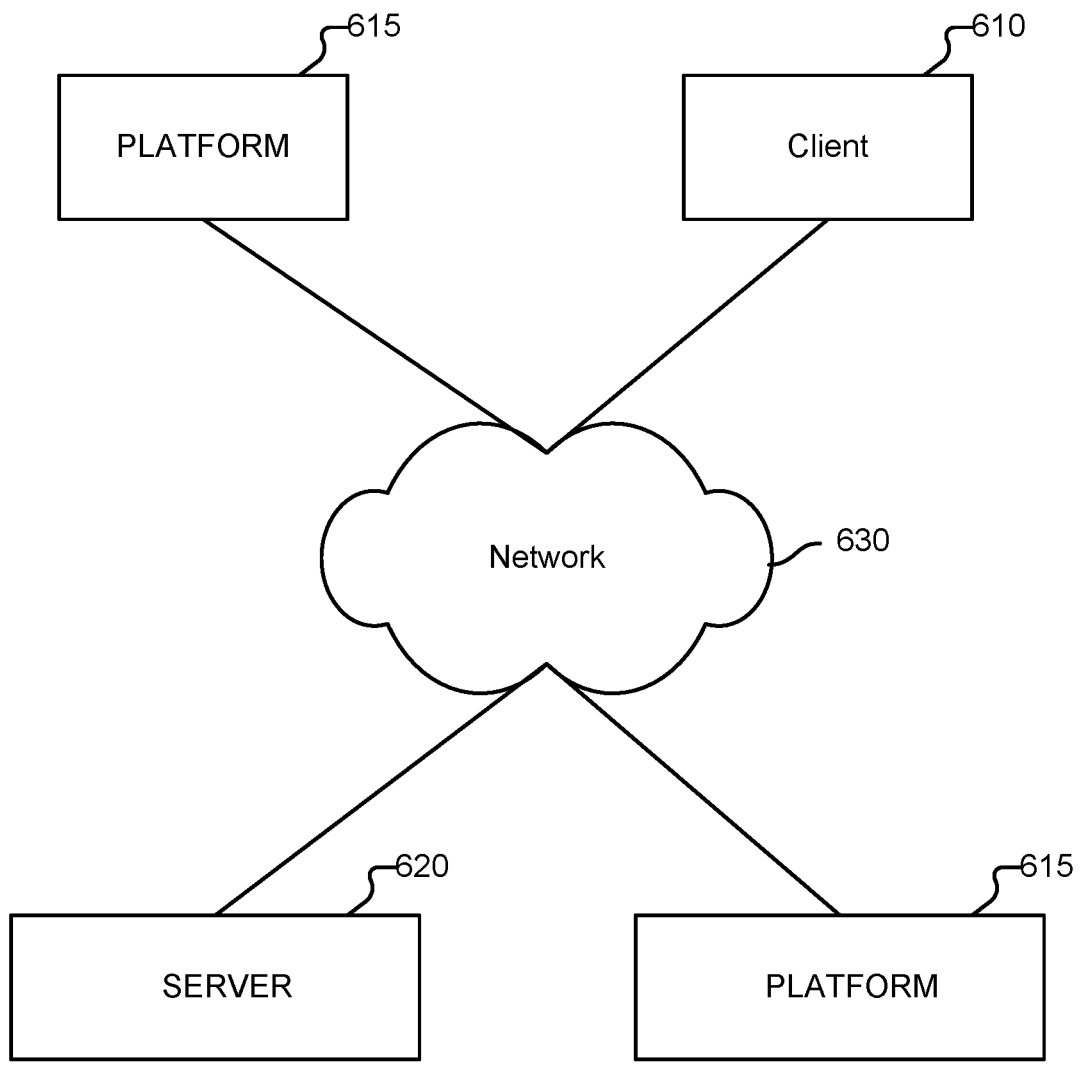
FIG. 6 is a diagram of an embodiment of a system for displaying recommendation information.

FIG. 6 is a diagram of an embodiment of a system for displaying recommendation information. In some embodiments, the system 600 includes a client 610, platforms 615, and server 620. The client 610, the platforms 615, and the server 620 are connected via a network 630. In some embodiments, the platforms 615 include news platforms, location service platforms, shopping platforms, social networking platforms, and other application environments requiring information recommendation to increase operational convenience and click-through rates for recommended information. In some embodiments, the server 620 maintains client device information, communicates with different clients, and tracks touch behavior from different users.

FIG. 1 is a flowchart of an embodiment of a process for displaying recommendation information. In some embodiments, the process 100 is implemented by the system 400 of FIG. 4A and comprises:

In 110, the device determines a target display position for recommended information based on a touch hot zone of a user. In some embodiments, the touch hot zone of the user is obtained based on the historical touch behavior data of the user.

In 120, the device displays the recommended information in the target display position.

A user can refer to any user using the terminal. As an example, the user is identified by a user ID or a terminal device ID. In other words, the user is not required to log onto a corresponding application platform (such as a news platform, a location service platform, a shopping platform, or a social networking platform) with a user ID. Different users can also be identified with device IDs.

In some embodiments, the touch hot zone of the user is used to indicate a touch area characterized by habitual operation of the user, high-frequency operation of the user, or both. The touch hot zone of the user can reflect an operating pattern of the user with regard to the touch area.

Figure 2:
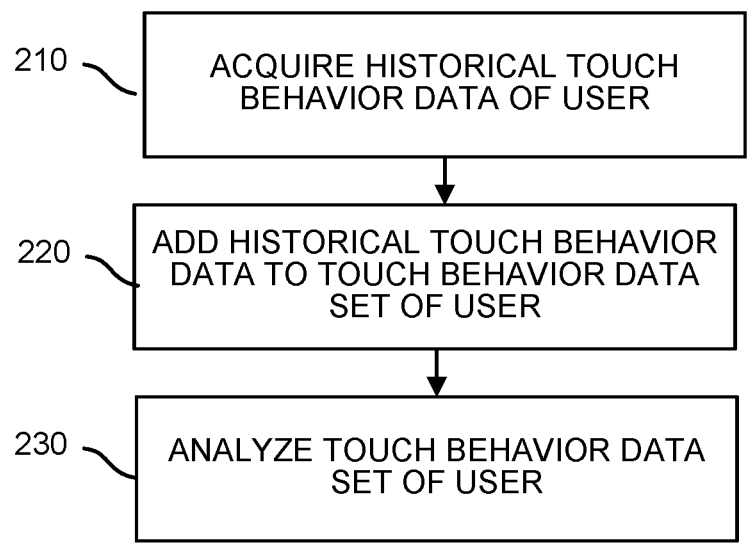
FIG. 2 is a flowchart of an embodiment of a process for determining a touch hot zone for a user.

FIG. 2 is a flowchart of an embodiment of a process for determining a touch hot zone for a user. In some embodiments, the process 200 is implemented by the system 400 of FIG. 4A and comprises:

In 210, the device acquires historical touch behavior data of a user.

In 220, the device adds the historical touch behavior data to a touch behavior data set of the user.

In 230, the device analyzes the touch behavior data set of the user to obtain a touch hot zone for the user.

As an example, operation 210 monitors the touch behavior of the user and records the corresponding historical touch behavior data. This touch behavior can include a click, a slide, or both. Any screen operation behavior can fall within the scope of protection for touch behavior. The present application imposes no restrictions as to particular touch behaviors.

In some embodiments, the historical touch behavior data include touch coordinate points. There are no restrictions on establishing a coordinate system corresponding to the touch coordinate points. For example, the upper-left corner of a screen can serve as the origin, with the x-axis as the horizontal direction and the y-axis as the vertical direction. Coordinate units can be coordinate percentages relative to the screen dimensions. As an example, assuming that the screen has a width of 500 and a height of 1,000, the coordinate units corresponding to the touch coordinate point (250, 400) in a coordinate system with the upper-left corner as the origin can be (250/500, 400/1000). The treatment of coordinates as coordinate units that are percentages relative to the screen dimensions can include standardizing or normalizing the coordinate units so that the coordinate units fall within [0,1]. Therefore, the touch coordinate points are generated by users on screens of different resolutions that can take and process the touch coordinate points for a uniform coordinate system and thereby adapt the coordinate system to screens of different resolutions. For example, in the event that User A owns more than one terminal and the terminals have different screen resolutions, the present technique can take the touch coordinate points generated by the user on screens of different resolutions and process the touch coordinate points for a uniform coordinate system.

The present technique can add the historical touch behavior data to a touch behavior data set of a user to maintain different touch behavior data sets for different users.

In some embodiments, the adding of the historical touch behavior data to the touch behavior data set of the user includes one or more of the following approaches:

adding approach 1: add acquired historical touch behavior data to a touch behavior data set of the user;

adding approach 2: add acquired historical touch behavior data within a preset time period to the touch behavior data set of the user; and/or adding approach 3: add acquired historical touch behavior data having data volume that has reached a preset data volume threshold to the touch behavior data set of the user.

Adding approach 1 can include adding each piece of historical touch behavior data to the touch behavior data set of the user. Adding approach 2 can include first collecting historical touch behavior data within a preset time period and then adding the historical touch behavior data within the preset time period to a touch behavior data set. The preset time period can be a time period of any length starting at any moment in time. For example, the length of the preset time period is 24 hours or 48 hours. Adding approach 3 can be based on a data volume in that the adding operation includes adding historical touch behavior data that has attained a preset data volume threshold (such as, for example, one thousand contact coordinate points) to the contact behavior data set of the user. With adding approach 1, the analysis of the touch behavior data set performed in operation 230 can be triggered whenever historical touch behavior data is acquired. As a result, the touch hot zone is better able to reflect the most recent data. With adding approach 2 and adding approach 3, the analysis of the touch behavior data set performed in operation 230 can be triggered upon compliance with a condition corresponding to time or data volume. Since such triggering can lower the frequency of touch behavior data set analysis, the triggering can reduce the computational load imposed by touch behavior data set analysis and increase terminal performance.

In some embodiments, operation 230 is executed directly after execution of operation 220. In some other embodiments, operation 230 is executed after operation 220 is executed and the touch behavior data set of the user complies with a preset trigger condition. An example of a predetermined trigger condition is provided below.

In some embodiments, operation 230, which includes analyzing the touch behavior data of the user, includes: analyzing the touch behavior data set of the user in the event that the data volume corresponding to the touch behavior data set of the user, application use time corresponding to the touch behavior data set of the user, or both complies with a predetermined trigger condition. In some embodiments, the timing of touch behavior data set analysis is controlled through a predetermined trigger condition. For example, compliance of the data volume corresponding to the touch behavior data set of the user with a predetermined trigger condition includes: the data volume corresponding to the touch behavior data set of the user being equal to or exceeding the preset data volume threshold (such as one thousand touch coordinate points). In another example, compliance of the application use time corresponding to the touch behavior data set of the user with a predetermined trigger condition includes: the application use time corresponding to the touch behavior data set of the user exceeding the time threshold (such as 24 hours, 48 hours, or 72 hours). No restrictions as to the particular predetermined trigger conditions are imposed.

Please note that the number of applications corresponding to the touch behavior data set of the user can be one or more. In the event that there is more than one application corresponding to the touch behavior data set of the user, analysis of the touch behavior data set can be triggered in the event that one of the multiple applications complies with the predetermined trigger condition, or analysis of the touch behavior data set can be triggered in the event that more than one of the multiple applications complies with the predetermined trigger condition.

As an example, any statistical analytic technique can be used in analyzing the touch behavior data set of the user to obtain the touch hot zone of the user. In some embodiments, the corresponding analysis result is the center coordinates of the touch hot zone. In some embodiments, the corresponding analysis result is a coordinate set included in the touch hot zone.

In some embodiments, the historical touch behavior data includes touch coordinate points and, in operation 230, the analyzing of the touch behavior data set of the user comprises:

counting the number of touch coordinate points falling within the first area units;

acquiring target first area units from multiple first area units in order of decreasing number of touch coordinate points in the first area units; and obtaining touch hot zones of the user according to the target first area units.

A first area unit can be an area of predetermined dimensions in the coordinate system. In some embodiments, the first area unit is a grid unit. For example, a screen is a grid divided according to its width and height into m rows and n columns equaling m×n grid units. In the event that it is assumed that the values of m and n are to be 100 and 200, respectively, the screen can be divided into 20,000 grid units.

In some embodiments, the device first counts the number of touch coordinate points that fall within each grid unit and records the number of the touch coordinate points, denoted as Num1(i,j), where i and j each indicate a grid unit index, and 0<i<m, 0<j<n. Then, target first area units are acquired from multiple first area units in order of decreasing number of touch coordinate points in the first area units. In some embodiments, counting is used to determine the target grid unit with the largest Num1(i,j), and the center of that target grid unit serves as the center of the touch hot zone. In some embodiments, to increase analytic accuracy or the coverage ratio of the touch hot zone, multiple grid units are sequenced in order of decreasing number of touch coordinate points in the first area units. The grid units in the first P ranks can then serve as the target grid units, where P is a positive integer.

Figure 7:
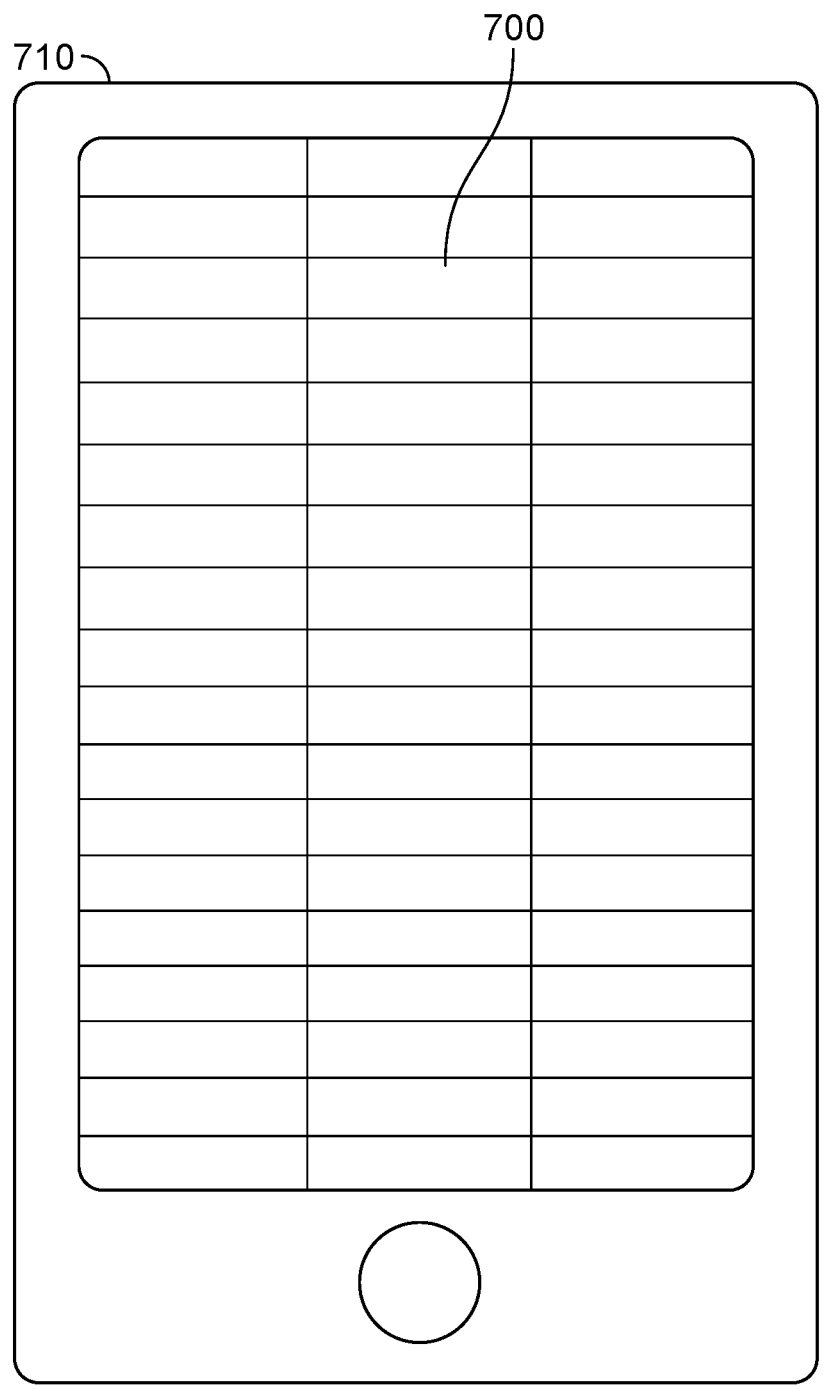
FIG. 7 is a diagram of an example of a grid.

FIG. 7 is a diagram of an example of a grid. As an example, the grid 700 is located in a display of a cell phone 710. The grid 700 includes M×N grid units. Each grid unit corresponds to a first area unit. Target first area units correspond to first area units having at least one touch coordinate point. For each target first area unit, the number of touch coordinate points is counted. The target first area units having the largest number of touch coordinate points are identified as target grid units.

Referring back to FIG. 2, in some embodiments, the historical touch behavior data includes touch coordinate points and, in operation 230, the analyzing of the touch behavior data set of the user includes:

counting the number of touch coordinate points falling within second area units constructed based on a respective touch coordinate point (e.g., the respective touch coordinate point is at the center of the second area unit);

acquiring target second area units from multiple second area units in order of decreasing number of touch coordinate points in the second area units; and obtaining touch hot zones of the user according to the target second area units.

In some embodiments, the second area units include dynamic areas with a touch coordinate point at the center, as opposed to first area units, which are pre-partitioned static areas. In some embodiments, a second area unit is a circle or a polygon with a touch coordinate point at the center. No restrictions as to the particular shape of the second area unit are imposed.

As an example, assume that a touch coordinate point is (x1, y1). Thus, a second area unit can be a circle having a center at (x1, y1) and a radius of r. As an example, when the user touches the screen, the point touched by the user is chosen as the center of a circle to be drawn, and subsequently, the circle is drawn based on the center and a preset radius. The drawn circle corresponds to a second area unit. When there are many second area units, and portions of the second area units may be overlapped. Furthermore, the coordinate points that fall within the circle having the center at (x1, y1) and radius r can be calculated. The technique for determining whether the coordinate points fall within the circle centered at (x1, y1) and a radius of r can include: Assume that the coordinates of circle center A are (x1, y1) and that the touch behavior data set also has touch coordinate point B, which is (x2, y2). Thus, the square of the distance AB is $w=[(x1-x2)^2+(y1-y2)^2]$. If w is less than the square of the radius r, then the distance of point B from point A is less than r. In other words, B is located within the circle with its center at (x1, y1) and radius r. Using this determination technique, the number of touch coordinate points that fall within the circle having the center at (x1, y1) and radius r can be calculated. In some embodiments, the determination technique is applied to all of the touch coordinate point. In some embodiments, the determination technique is applied to a portion of the touch coordinate points.

Figure 8:
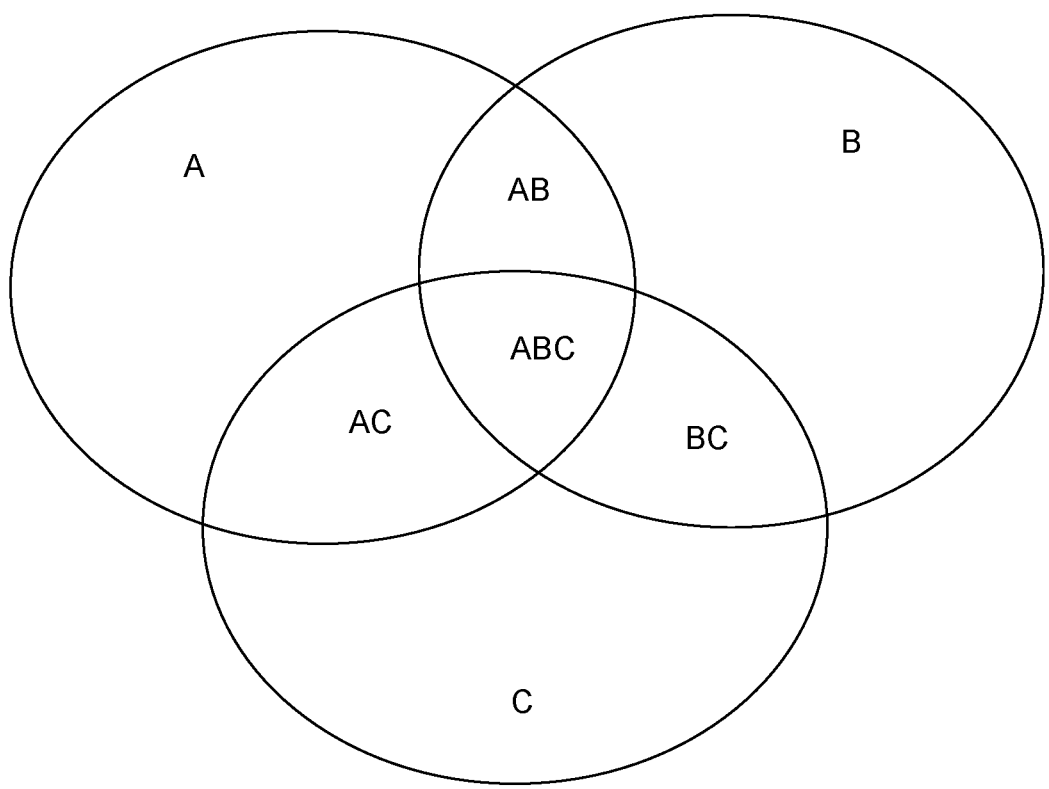
FIG. 8 is a diagram of examples of second area units.

FIG. 8 is a diagram of examples of second area units. The diagram illustrates three circles A, B, and C corresponding to three different second area units. Three different touch point coordinates (not shown) represent the centers of circles A, B, and C of having the same preset radius. Circles A and B overlap at section AB. Circles A and C overlap at section AC. Circles B and C overlap at section BC. Circles A, B, and C all overlap at section ABC.

Regarding the acquiring of the target second area units from multiple second area units in order of decreasing number of touch coordinate points in the second area units and the obtaining of the touch hot zone of the user based on the target second area units, those operations are similar to the acquiring of the target first area units from multiple first area units in order of decreasing number of touch coordinate points in the first area units and the obtaining of the touch hot zone of the user based on the target first area units. Therefore, those operations will not be discussed further for conciseness.

Please note that a situation can occur where the touch behavior data set of the user does not comply with a predetermined trigger condition. For example, the first time User B uses a terminal with an internal touch sensor or external touch sensor, the data volume corresponding to the touch behavior data set of User B may not satisfy or exceed a preset data threshold. In such a situation, the touch hot zone for the majority of users (as determined by, for example, a server communicating with different terminals and tracking the touch hot zones from different users) can serve as the touch hot zone of User B until the data volume corresponding to the touch behavior data set of User B exceeds the preset data volume threshold. In some embodiments, the determining of the touch hot zone for the majority of users includes: determining the touch hot zones of multiple users according to these users; selecting the highest-frequency touch hot zone from the touch hot zones of the multiple users; and regarding the selected highest-frequency touch hot zone as the touch hot zone for the majority of users. No restrictions as to the determination of the touch hot zone for the majority of users are imposed.

As an example, the terminal client saves the touch hot zone of the user which was obtained in operation 230, or the server saves the touch hot zones of the users corresponding to various clients. At the same time, the terminal client or the server can also save user IDs, device IDs, or both. Thus, in the event that information is to be recommended, the user's touch hot zone can be acquired from pre-saved content located at the terminal or obtained from the server. In some embodiments, the user's touch hot zone is acquired from pre-saved content. In some embodiments, the touch hot zone of the user can be obtained when the analysis of the touch behavior data set of the user of operation 230 is triggered. No restrictions are imposed on the approach to acquire the user's touch hot zone.

In some embodiments, the touch hot zone of a user that is determined based on the user's historical touch behavior data is used to indicate the touch area associated with habitual operations of the user, high-frequency operations of the user, or both and reflects the operating patterns of the user with regard to the touch area. As an example, if the user is a left handed user, the user touches the left side of screen more frequently than the right side. Therefore, determining a target display position for recommended information based on the touch hot zone of the user can result in the target display position being a favorable position that corresponds to the touch hot zone of the user. Therefore, situations where the user overlooks recommended information as a result of the target display position being unfavorable can be avoided. Furthermore, clicking the recommended information can be made more convenient for the user and recommended information click-through rates can be increased.

In some embodiments, the determining approach of operation 110 of FIG. 1, based on the touch hot zone of a user, to determine a target display position for recommended information can include:

determining approach 1: regard the display position corresponding to the touch hot zone of the user as the target display position for recommended information;

determining approach 2: adjust position weights for multiple display positions based on touch hot zones of the user, and determine target display positions for recommended information based on the adjusted position weights of the multiple display positions; and/or both determining approach 1 and determining approach 2.

Determining approach 1 can directly regard the touch hot zone of the user as the target display position for the recommended information. In this way, the recommended information can be directly displayed in the touch hot zone of the user. In some embodiments, the center of the target display position for the recommended information corresponds to the center of the touch hot zone. No restrictions as to the particular target display positions are imposed. For example, in the event that a terminal is habitually held in a user's right hand, then the user's historical touch behavior data can be analyzed to obtain the following touch hot zone for the user: lower-right corner area. Thus, recommended information can be displayed in the lower-right corner area of the screen. In the event that a terminal is habitually held in a user's left hand, then the user's historical touch behavior data can be analyzed to obtain the following touch hot zone for the user: lower-left corner area. Thus, the recommended information can be displayed in the lower-left corner area of the screen. In the event that a user who habitually holds a terminal in both hands exists, then the user's historical touch behavior data can be analyzed to obtain the following touch hot zone for the user: middle area. Thus, the recommended information can be displayed in the middle area of the screen. Thereby, operating convenience and click-through rates for recommended information can be increased.

Figure 3:
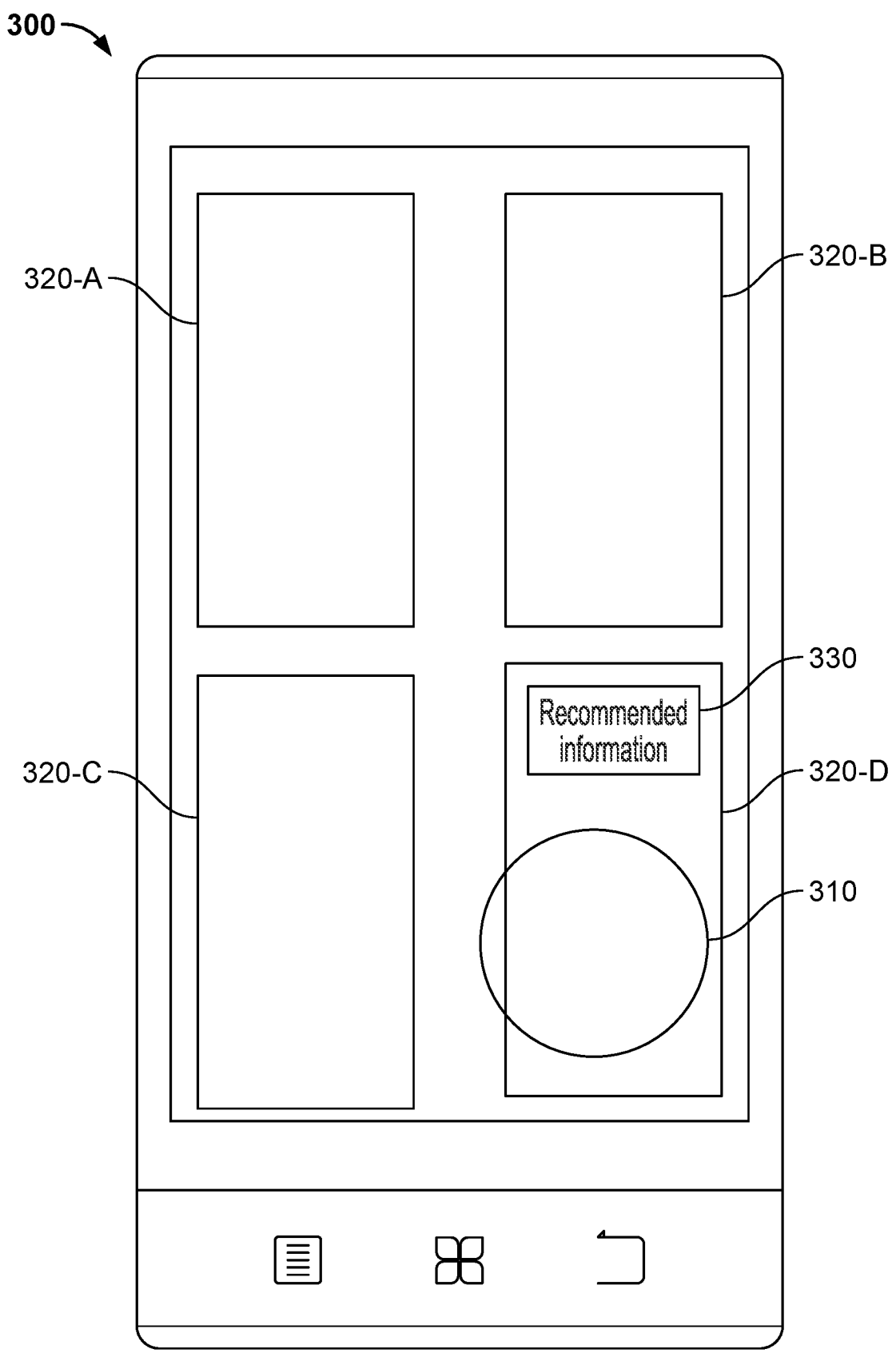
FIG. 3 is an example of a recommendation scenario.

FIG. 3 is an example of a recommendation scenario. Assume that, in terminal 300, the touch hot zone of the user is 310 and that the display positions of applications include display position 320-A, display position 320-B, display position 320-C, and display position 320-D. Since the degree of overlap between touch hot zone 310 and display position 320-D is higher than the overlap between touch hot zone 310 and other display positions, display position 320-D can be considered the display position corresponding to the touch hot zone 310. Display position 320-D can then serve as the target display position for the recommended information, and the recommended information 330 can be displayed in display position 320-D.

The display rule employed by determining approach 2 can include position weighting of display positions. The position weighting corresponds to a probability that the recommended information appears in a display position. In some embodiments, the position weights for display positions are typically of equal weight. In some embodiments, the position weight for the display position corresponding to the touch hot zone is increased by adjusting positions weights for multiple display positions.

In some embodiments, the adjusting of the position weights for multiple display positions based on touch hot zones of the user includes: increasing the position weights for the display positions corresponding to the touch hot zones of the user.

In a first application example, assume that a shopping app includes four display positions w1, w2, w3, and w4 located in the upper-left, lower-left, upper-right, and lower-right. Initially, each position weight can be 25% for all four of these display positions. Assume that the touch hot zone is located within the boundaries of the w2 area. In this case, the position weight for w2 can increase to 70%, while the position weights for w1, w3, and w4 drop to 10%. In some embodiments, the amount that the position weight is increased/decreased is determined based on the amount of overlap between a given display position and the touch hot zone. After the adjusting of the position weights, the probability that the display position corresponding to the touch hot zone will be chosen as the target display position for the recommended information is increased.

In a second application example, assume that the shopping app includes two display positions w5 and w6 located on the left and right sides. Initially, the position weight for each of these two display positions can be 50%. Assume that the touch hot zone is located within the boundaries of the w5 area. In this case, the position weight for the w5 area can be increased to 80%, while the position weight for the w6 area drops to 20%. Accordingly, the display probability for the display position corresponding to the touch hot zone can be increased. In other words, the above situation where the position weights for multiple display positions are equal is merely optional. No restrictions as to the magnitude of position weights for multiple display positions are imposed.

In some embodiments, one or more touch hot zones of a user exist. Thus, positions weights for display positions corresponding to multiple touch hot zones of the user can be individually increased. In some embodiments, the increased ratios for corresponding position weights are determined based on the numbers of touch coordinate points included in the multiple touch hot zones of the user. For example, the touch hot zones which include different number of touch coordinate points will have different increase ratios. In another example, ranks corresponding to touch hot zones are determined based on the numbers of touch coordinate points included in the touch hot zones. In the event that the ranks differ, the increase ratios for the corresponding position weights will differ. No restrictions as to the particular process for increasing position weights for display positions corresponding to the touch hot zones of the user are imposed.

In a third application example, assume that a shopping app includes four display positions w1, w2, w3, and w4 located in the upper-left, lower-left, upper-right, and lower-right. In some embodiments, each position weight is 25% for all four of these positions. Assume that a first-rank touch hot zone and a second-rank touch hot zone are located within the boundaries of w2 and w1, respectively, and that the number of touch coordinate points included in the first-rank touch hot zone is greater than the number of touch coordinate points included in the second-rank touch hot zone. Thus, the position weight of w2 can be increased to 50% and the position weight of w1 is increased to 40%, while the position weights for both w3 and w4 are reduced to 5%. The display probability for the display position corresponding to the touch hot zone can be increased.

In some embodiments, the determining of the target display positions for the recommended information based on the adjusted position weights of multiple display positions includes:

acquiring, from the multiple display positions, to-be-allocated display positions having adjusted position weights complying with a predetermined weight condition;

allocating the to-be-allocated display positions to the recommended information; and regarding the to-be-allocated display positions as target display positions for the recommended information.

In some embodiments, the predetermined weight condition includes: display positions having adjusted position weights that exceed a weight threshold; the first Q display positions where multiple display positions have been ranked in order of decreasing adjusted position weights, where Q is a positive integer; or both. Other appropriate predetermined weight conditions can be used and no restrictions as to the particular predetermined weight condition are imposed.

In some embodiments, the allocating of the to-be-allocated display positions to the recommended information includes: allocating the to-be-allocated display positions to the recommended information in high-to-low priority order. In some embodiments, the adjusted position weights for to-be-allocated display positions for high-priority recommended information are higher than the adjusted position weights for to-be-allocated display positions for low-priority recommended information.

Information priority levels can be used to indicate priority levels corresponding to the recommended information. Determining the information priority levels corresponding to recommended information is understood by one of ordinary skill and will not be further discussed for conciseness. For example, in the event that the recommended information is a product, the priority level corresponding to the product can be determined according to factors such as product sales volume, comments, etc. No restrictions as to the specific manner in which information priority levels are determined are imposed.

Regarding the third application example, assume that the number of recommended products is 6. In other words, there are 6 products to be recommended: product 1, product 2, product 3, product 4, product 5, and product 6. These 6 products can be added to the display positions corresponding to w2 (lower-left) and w1 (upper-left), and these 6 products may be displayed over 3 pages. For example, page 1 displays product 1 and product 2; page 2 displays product 3 and product 4; and page 3 displays product 5 and product 6. Moreover, assume that the information priority level corresponding to product 1 is higher than the information priority level corresponding to product 2. Thus, product 1 can be displayed in the display position corresponding to w2, and product 2 is displayed in the display position corresponding to w1. Products 3, 4, 5, and 6 can be displayed accordingly. In other words, product 1 is displayed at position w2 (lower-left) on page 1 and product 2 is displayed at position w1 (upper-left) on page 1, product 3 is displayed at display position w2 (lower-left) on page 2 and product 4 is displayed at position w1 (upper-left) on page 2, and product 5 is displayed at display position w2 (lower-left) on page 3 and product 6 is displayed at position w1 (upper-left) on page 3.

Increasing position weights for display positions corresponding to the touch hot zones of the user can increase the display probability of display positions corresponding to the touch hot zones and decrease the display probability of display positions not corresponding to the touch hot zones. Therefore, making the target display position for recommended information more prominent and easy for the user to operate is possible and recommended information operating convenience and click-through rates can be increased.

In summary, the touch hot zone of a user can be obtained based on the historical touch behavior data of the user, a target display position for recommended information can be determined based on the touch hot zone of the user, and the recommended information can be displayed in the target display position. The touch hot zone can be used to indicate the touch zone characterized by habitual operations of the user, high-frequency operations of the user, or both and can reflect the operating patterns of the user regarding the touch zone. Therefore, determining a target display position for recommended information based on the touch hot zone of the user can result in the target display position being a favorable position that corresponds to the touch hot zone of the user. Therefore, the target display position being a favorable position can avoid situations where the user overlooks recommended information as a result of the target display position being unfavorable. Furthermore, the target display position being a favorable position can make clicking the recommended information more convenient for the user and increase recommended information click-through rates.

Figure 4A:
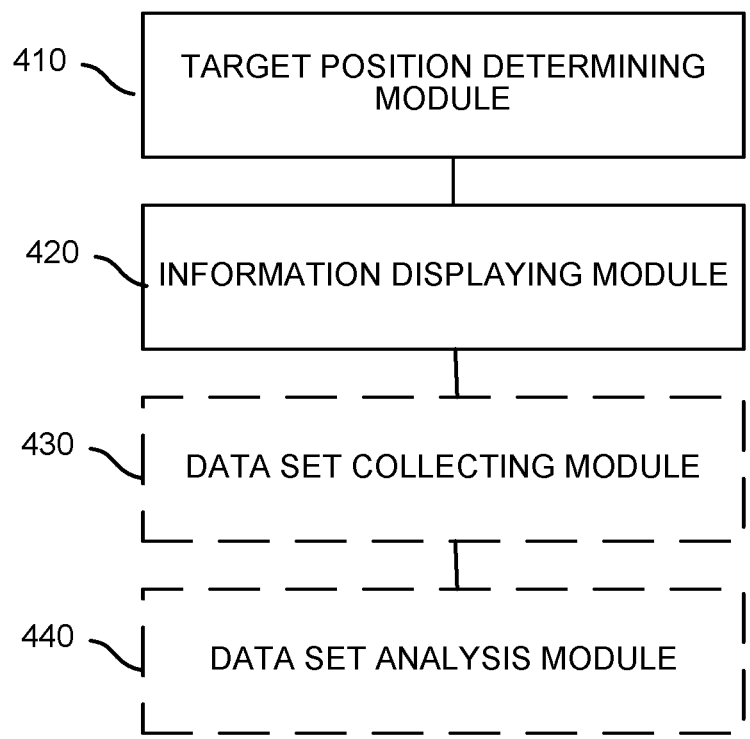
FIG. 4A is a structural block diagram of an embodiment of a system for displaying recommendation information.

FIG. 4A is a structural block diagram of an embodiment of a system for displaying recommendation information. In some embodiments, the system 400 is configured to perform process 100 and comprises: a target position determining module 410 and an information displaying module 420.

In some embodiments, the target position determining module 410 is configured to determine a target display position for recommended information based on a touch hot zone of a user In some embodiments, the touch hot zone of the user is obtained based on historical touch behavior data of the user; and In some embodiments, the information displaying module 420 is configured to display the recommended information in the target display position.

Figure 4B:
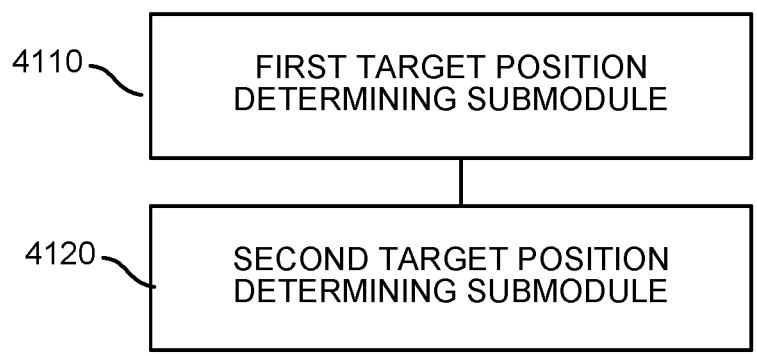
FIG. 4B is a structural block diagram of an embodiment of a target position determining module.

FIG. 4B is a structural block diagram of an embodiment of a target position determining module. In some embodiments, the target position determining module 4100 is an implementation of the target position determining module 410 of FIG. 4A and includes: a first target position determining submodule 4110, a second target position determining submodule 4120, or both.

In some embodiments, the first target position determining submodule 4110 is configured to regard the display position corresponding to the touch hot zone of a user as the target display position for recommended information.

In some embodiments, the second target position determining submodule 4120 is configured to adjust position weights for multiple display positions based on touch hot zones of the user, and determine target display positions for recommended information based on the adjusted position weights of the multiple display positions.

In some embodiments, the second target position determining submodule 4120 is further configured to increase position weights for display positions corresponding to the touch hot zones of a user.

Figure 4C:
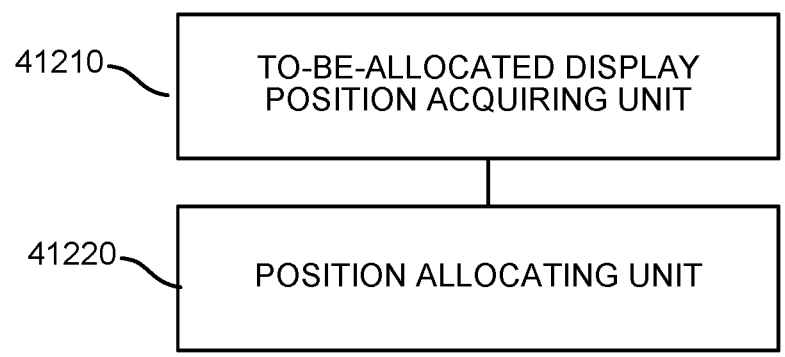
FIG. 4C is a structural block diagram of an embodiment of a second target position determining submodule.

FIG. 4C is a structural block diagram of an embodiment of a second target position determining submodule. In some embodiments, the second target position determining submodule 41200 is an implementation of the second target position determining submodule 4120 of FIG. 4B and includes: a to-be-allocated display position acquiring unit 41210 and a position allocating unit 41220.

In some embodiments, the to-be-allocated display position acquiring unit 41210 is configured to acquire from the multiple display positions to-be-allocated display positions having adjusted position weights that comply with a predetermined weight condition; and In some embodiments, the position allocating unit 41220 is configured to allocate the to-be-allocated display positions to the recommended information and regard the to-be-allocated display positions as target display positions for the recommended information.

In some embodiments, the position allocating unit 41220 is further configured to allocate the to-be-allocated display positions to recommended information in high-to-low priority order. In some embodiments, the adjusted position weights for to-be-allocated display positions for high-priority recommended information are higher than the adjusted position weights for to-be-allocated display positions for low-priority recommended information.

Referring back to FIG. 4A, in some embodiments, the system 400 further comprises: a data set collecting module 430 and a data set analysis module 440.

In some embodiments, the data set collecting module 430 is configured to acquire historical touch behavior data of the user, and add the historical touch behavior data to a touch behavior data set of the user.

In some embodiments, the data set analysis module 440 is configured to analyze the touch behavior data set of the user to obtain a touch hot zone for the user.

In some embodiments, the historical touch behavior data includes touch coordinate points, and the data set analysis module 440 is further configured to count the number of touch coordinate points falling within first area units, acquire target first area units from multiple first area units in order of decreasing number of touch coordinate points in the first area units, and obtain touch hot zones of the user based on the target first area units.

In some embodiments, the historical touch behavior data includes touch coordinate points, and the data set analysis module 440 is further configured to count the number of touch coordinate points falling within second area units in which a touch coordinate point is at the center, acquire target second area units from multiple second area units in order of decreasing number of touch coordinate points in the second area units, and obtain touch hot zones of the user based on the target second area units.

In some embodiments, the data set analysis module 440 is further configured to analyze the touch behavior data set of the user in the event that the data volume corresponding to the touch behavior data set of the user, application use time corresponding to the touch behavior data set of the user, or both comply with a predetermined trigger condition.

In some embodiments, the data set collecting module 430 is further configured to add acquired historical touch behavior data to a touch behavior data set of the user, add acquired historical touch behavior data within a preset time to a touch behavior data set of the user, add acquired historical touch behavior data having a data volume that has reached a preset data volume threshold to a touch behavior data set of the user, and/or any combination thereof.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 5:
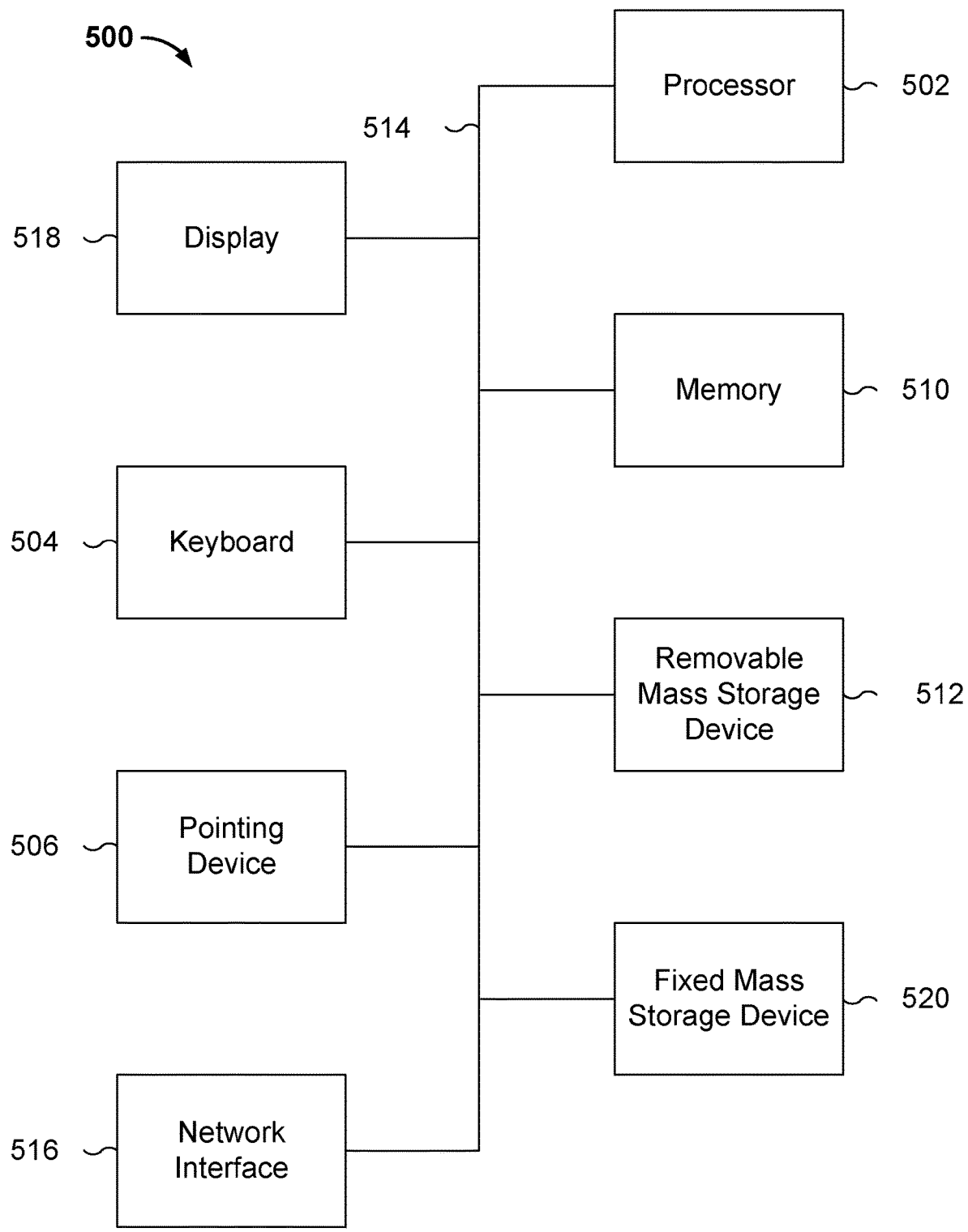
FIG. 5 is a functional diagram illustrating a programmed computer system for displaying recommendation information in accordance with some embodiments.

FIG. 5 is a functional diagram illustrating a programmed computer system for displaying recommendation information in accordance with some embodiments. As will be apparent, other computer system architectures and configurations can be used to load resources. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown).

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storages 512 and 520 generally store additional programming instructions, data, and the like that typically are not in active use by the processor 502. It will be appreciated that the information retained within mass storages 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining a touch hot zone of a user, comprising:
   determining whether a data volume corresponding with historical touch behavior data of the user exceeds a preset data volume threshold;

in response to the determination that the data volume corresponding with the historical touch behavior data of the user fails to exceed the preset data volume threshold, determining a touch hot zone of a plurality of users, comprising:
  determining touch hot zones of the plurality of users; and
  selecting, as the touch hot zone of the plurality of users, one or more of the highest frequency touch hot zones from the determined touch hot zones of the plurality of users; and
regarding the touch hot zone of the plurality of users as the touch hot zone of the user;
determining, based on the touch hot zone of the user, a target display position for recommended information; and
displaying the recommended information in the target display position.

2. The method as described in claim 1, wherein the determining of the target display position for the recommended information comprises:
  regarding a display position corresponding to the touch hot zone of the user as the target display position for the recommended information.

3. The method as described in claim 1, wherein the determining of the target display position for the recommended information comprises:
  adjusting position weights for multiple display positions according to the touch hot zone of the user; and
  determining the target display position for the recommended information based on the adjusted position weights of the multiple display positions.

4. The method as described in claim 3, wherein the adjusting of the position weights for the multiple display positions according to the touch hot zone of the user comprises:
  increasing position weights for display positions corresponding to the touch hot zone of the user.

5. The method as described in claim 3, wherein the determining of the target display position for the recommended information comprises:
  acquiring, from the multiple display positions, to-be-allocated display positions having adjusted position weights that comply with a predetermined weight condition;
  allocating the to-be-allocated display positions to the recommended information; and
  regarding one or more of the to-be-allocated display positions as the target display position for the recommended information.

6. The method as described in claim 5, wherein the allocating of the to-be-allocated display positions to the recommended information comprises:
  allocating the to-be-allocated display positions to the recommended information in high-to-low priority order, wherein adjusted position weights for to-be-allocated display positions for high-priority recommended information are higher than adjusted position weights for to-be-allocated display positions for low-priority recommended information.

7. The method as described in claim 1, wherein the touch hot zone of the user is determined by:
  acquiring the historical touch behavior data of the user;
  adding the historical touch behavior data to a touch behavior data set of the user; and
  analyzing the touch behavior data set of the user to obtain the touch hot zone for the user.

8. The method as described in claim 7, wherein:
the historical touch behavior data comprises touch coordinate points; and
the analyzing of the touch behavior data set of the user comprises:
  determining a number of touch coordinate points falling within first area units;
  acquiring one or more target first area units from the first area units in order of decreasing number of touch coordinate points in the first area units; and
  obtaining the touch hot zone of the user based on the one or more target first area units.

9. The method as described in claim 7, wherein:
the historical touch behavior data comprises touch coordinate points; and
the analyzing of the touch behavior data set of the user comprises:
  determining a number of touch coordinate points falling within second area units, a second area unit having a touch coordinate point at the center of the second area unit;
  acquiring target second area units from the second area units in order of a decreasing number of touch coordinate points in the second area units; and
  obtaining the touch hot zone of the user according to one or more of the target second area units.

10. The method as described in claim 7, wherein the analyzing of the touch behavior data set of the user comprises:
  analyzing the touch behavior data set of the user in response to a determination that a data volume corresponding to the touch behavior data set of the user, application use time corresponding to the touch behavior data set of the user, or both comply with a predetermined trigger condition.

11. The method as described in claim 7, wherein the adding of the historical touch behavior data to the touch behavior data set of the user comprises:
  performing one or more of the following:
  adding the acquired historical touch behavior data to the touch behavior data set of the user;
  adding the acquired historical touch behavior data within a preset time period to the touch behavior data set of the user; and/or
  adding the acquired historical touch behavior data having a data volume that has reached a preset data volume threshold to the touch behavior data set of the user.

12. A system, comprising:
a processor; and
a memory coupled with the processor, wherein the memory is configured to provide the processor with instructions which when executed cause the processor to:
  determine a touch hot zone of a user, comprising to:
    determine whether a data volume corresponding with historical touch behavior data of the user exceeds a preset data volume threshold;
    in response to the determination that the data volume corresponding with the historical touch behavior data of the user fails to exceed the preset data volume threshold, determine a touch hot zone of a plurality of users, comprising to:
      determine touch hot zones of the plurality of users; and
      select, as the touch hot zone of the plurality of users, one or more of the highest frequency touch hot zones from the determined touch hot zones of the plurality of users; and regard the touch hot zone of the plurality of users as the touch hot zone of the user;

determine, based on the touch hot zone of the user, a target display position for recommended information; and display the recommended information in the target display position.

13. The system as described in claim 12, wherein the determining of the target display position for recommended information comprises to:

regard a display position corresponding to the touch hot zone of the user as the target display position for the recommended information.

14. The system as described in claim 12, wherein the determining of the target display position for recommended information comprises to:

adjust position weights for multiple display positions according to the touch hot zone of the user; and determine the target display position for the recommended information based on the adjusted position weights of the multiple display positions.

15. The system as described in claim 14, wherein the adjusting of the position weights for the multiple display positions according to the touch hot zone of the user comprises to:

increase position weights for display positions corresponding to the touch hot zone of the user.

16. The system as described in claim 14, wherein the determining of the target display position for recommended information comprises to:

acquire, from the multiple display positions, to-be-allocated display positions having adjusted position weights comply with a predetermined weight condition;

allocate the to-be-allocated display positions to the recommended information; and regard one or more of the to-be-allocated display positions as the target display position for the recommended information.

17. The system as described in claim 16, wherein the allocating of the to-be-allocated display positions to the recommended information comprises to:

allocate the to-be-allocated display positions to the recommended information in high-to-low priority order, wherein adjusted position weights for to-be-allocated display positions for high-priority recommended information are higher than adjusted position weights for to-be-allocated display positions for low-priority recommended information.

18. The system as described in claim 12, wherein the touch hot zone of the user is determined by:

acquiring the historical touch behavior data of the user;

adding the historical touch behavior data to a touch behavior data set of the user; and analyzing the touch behavior data set of the user to obtain a touch hot zone for the user.

19. The system as described in claim 18, wherein:

the historical touch behavior data comprises touch coordinate points; and the analyzing of the touch behavior data set of the user comprises to:

count a number of touch coordinate points falling within first area units;

acquire one or more target first area units from the first area units in order of decreasing number of touch coordinate points in the first area units; and obtain the touch hot zone of the user based on the one or more target first area units.

20. The system as described in claim 18, wherein:

the historical touch behavior data comprises touch coordinate points; and the analyzing of the touch behavior data set of the user comprises to:

count a number of touch coordinate points falling within second area units, a second area unit having a touch coordinate point at the center of the second area unit;

acquire target second area units from the second area units in order of a decreasing number of touch coordinate points in the second area units; and obtain the touch hot zone of the user according to one or more of the target second area units.

21. A computer program product being embodied in a tangible non-transitory computer readable storage medium and comprising computer instructions for:

determining a touch hot zone of a user, comprising:

determining whether a data volume corresponding with historical touch behavior data of the user exceeds a preset data volume threshold;

in response to the determination that the data volume corresponding with the historical touch behavior data of the user fails to exceed the preset data volume threshold, determining a touch hot zone of a plurality of users, comprising:

determining touch hot zones of the plurality of users; and selecting, as the touch hot zone of the plurality of users, one or more of the highest frequency touch hot zones from the determined touch hot zones of the plurality of users; and regarding the touch hot zone of the plurality of users as the touch hot zone of the user;

determining, based on the touch hot zone of the user, a target display position for recommended information; and displaying the recommended information in the target display position.

* * * * *

UNITED STATES PATENT AND TRADEMARK OFFICE
CERTIFICATE OF CORRECTION

PATENT NO. : 10,908,790 B2
APPLICATION NO. : 16/733526
DATED : February 2, 2021
INVENTOR(S) : Xuan Zhang Page 1 of 1

It is certified that error appears in the above-identified patent and that said Letters Patent is hereby corrected as shown below:

On the Title Page

Item (71) Applicant, delete "(CN)" and insert --(HK)--, therefor.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*